(12) United States Patent
Carroll

(10) Patent No.: US 7,748,068 B2
(45) Date of Patent: Jul. 6, 2010

(54) DECORATION SOLAR PANEL BRIDGE SUPPLYING POWER SOURCES

(76) Inventor: Min Carroll, P.O. Box 236, Warrenville, IL (US) 60555

( * ) Notice: Subject to any disclaimer, the term of this patent is extended or adjusted under 35 U.S.C. 154(b) by 0 days.

(21) Appl. No.: 12/077,697

(22) Filed: Mar. 20, 2008

(65) Prior Publication Data
US 2009/0235593 A1    Sep. 24, 2009

(51) Int. Cl.
*E01D 4/00* (2006.01)
*E04D 13/18* (2006.01)
*A63H 3/52* (2006.01)

(52) U.S. Cl. .......................... 14/24; 52/173.3; 446/476

(58) Field of Classification Search ............... 52/173.3, 52/90.1, 86; D52/52, 61; 14/2.4, 3, 4, 24; 446/476
See application file for complete search history.

(56) References Cited

U.S. PATENT DOCUMENTS

| | | | | | |
|---|---|---|---|---|---|
| 110,173 | A | * | 12/1870 | Turly | 14/9 |
| 542,531 | A | * | 7/1895 | Ogle | 14/9 |
| 2,452,888 | A | * | 11/1948 | Woodward | 446/113 |
| 2,507,354 | A | * | 5/1950 | Spunberg | 446/105 |
| 2,592,610 | A | * | 4/1952 | Shumaker | 52/69 |
| 3,768,108 | A | * | 10/1973 | Wadsworth | 14/24 |
| 4,011,697 | A | | 3/1977 | Fedolfi | |
| 4,118,816 | A | * | 10/1978 | Mittag | 14/69.5 |
| 4,162,551 | A | * | 7/1979 | Serrano | 14/69.5 |
| 4,663,898 | A | | 5/1987 | Yacaboni | |
| 4,839,935 | A | * | 6/1989 | Calcagni et al. | 14/24 |
| 6,179,218 | B1 | | 1/2001 | Gates | |
| 6,421,863 | B1 | * | 7/2002 | Tiffany | 14/2.4 |
| 6,799,345 | B2 | * | 10/2004 | Occhiolini et al. | 14/12 |
| 7,012,188 | B2 | * | 3/2006 | Erling | 136/251 |
| 7,240,387 | B1 | * | 7/2007 | Berggren | 14/24 |
| 2004/0065025 | A1 | | 4/2004 | Durham | |
| 2005/0121072 | A1 | | 6/2005 | Stengel | |
| 2008/0002398 | A1 | | 1/2008 | Ortiz Sacristan | |

FOREIGN PATENT DOCUMENTS

CN    2007-20200424    *    5/2007

(Continued)

OTHER PUBLICATIONS

Author: James L. Rogers. title: The Complete Patent Kit, publisher: Sphinx publishing, An Imprint of Sourcebooks, Inc., year published: 2005, place of published: Naperville, IL USA.

*Primary Examiner*—D. Dunn
*Assistant Examiner*—Babajide Demuren

(57) ABSTRACT

A decoration solar panel bridge supplying power sources, for commercial and residential applications, incorporates at least one solar panel in a decoration bridge comprising members of frame, cross brace and board. The wide boards including solar panels cover straight beams and cross braces as a partial or full surface of the bridge. The slice boards cover the top arc beams or alternative round beams as partial surfaces of the bridge. Each solar panel output power and dimension can be designed for desired power consumption and needed. The alternative frame members can be used to construct different shapes of the bridge and can replace the curve shape frame members. The decoration bridge includes optional members: safety fence members, supporting members and handrail members. Solar powered lights can be installed at the top of safety poles and solar powered light stands can replace the vertical spindle of handrails.

9 Claims, 7 Drawing Sheets

FOREIGN PATENT DOCUMENTS

| | | | |
|---|---|---|---|
| DE | 29614156 U1 | * | 2/1997 |
| DE | 19805086 A1 | * | 7/1998 |
| DE | 19802762 A1 | * | 7/1999 |
| DE | 10327762 | * | 1/2005 |
| JP | 09137405 | * | 5/1997 |

* cited by examiner

DECORATION SOLAR PANEL BRIDGE SUPPLYING POWER SOURCES

BACKGROUND OF THE INVENTION

Using solar panels as power supplies present challenges. A stand alone solar panel in the area of a residential garden or a corner of a golf course or resort with water features, recharging batteries or illuminating lights tends to be dull looking and not consistent with the natural look of landscaping if the shape of a rectangle and the color of solar panels are not coordinated with a soothing and relaxing environment. The prior art only used a small sized solar panel to power a small fountain. In some cases the solar cells are about 4 cm by about 4 cm in size. This power consumption is approximately less than 3 W which is very limited usage of solar powered applications. A single power source of solar panel can only do one function at a time. Therefore, the operational functionality supports limited activity.

This invention will solve these problems by incorporating solar panels with a decorative structure such as a bridge to support solar panel power sources. Each solar panel dimension can be designed as needed and each solar panel output power can be designed for desired power consumption. This extends usage of solar power to increase operational functionality and activity.

DETAILED DESCRIPTION OF DRAWINGS

Figure 1:
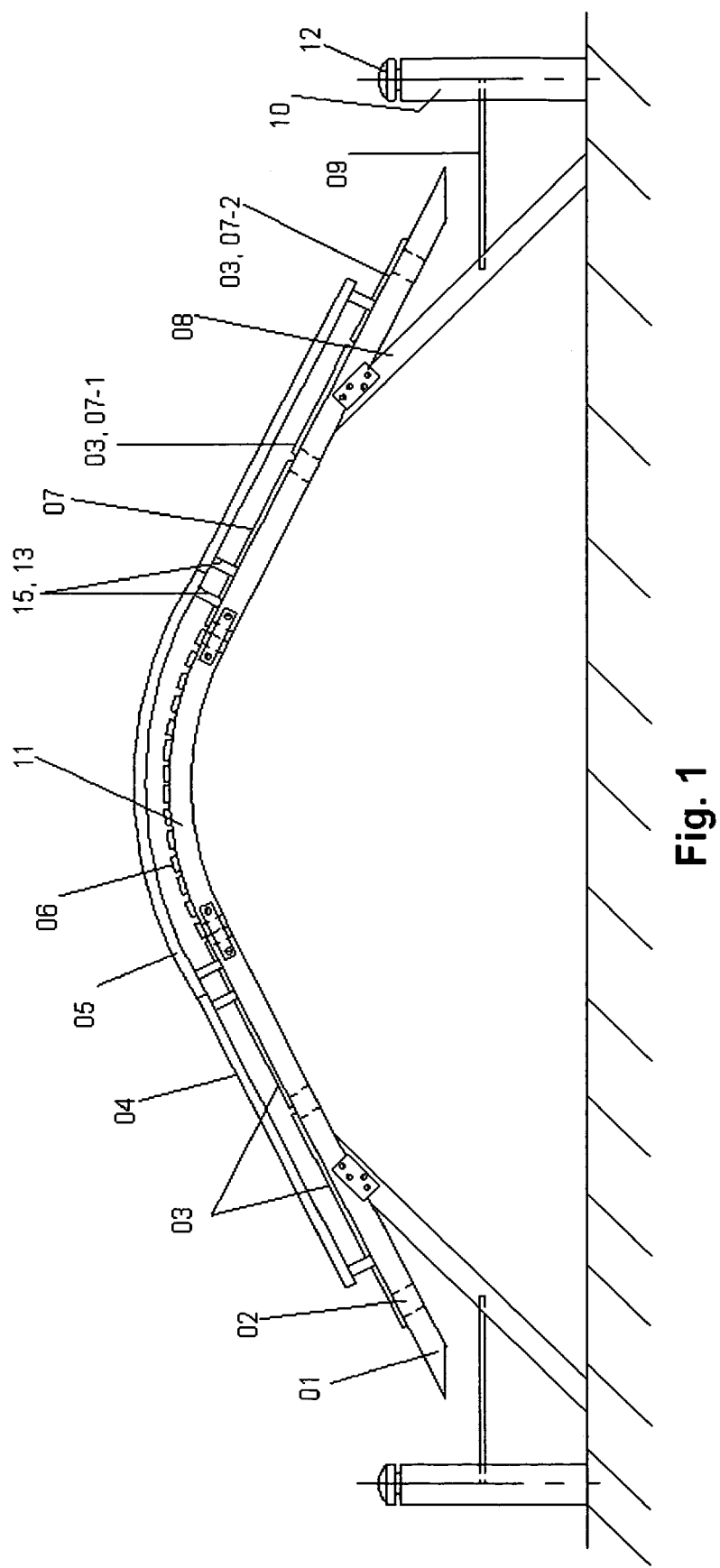
FIG. 1 is a lateral view of an assembled decoration solar panel bridge for power sources, according to a preferred embodiment of invention.
Figure 2:
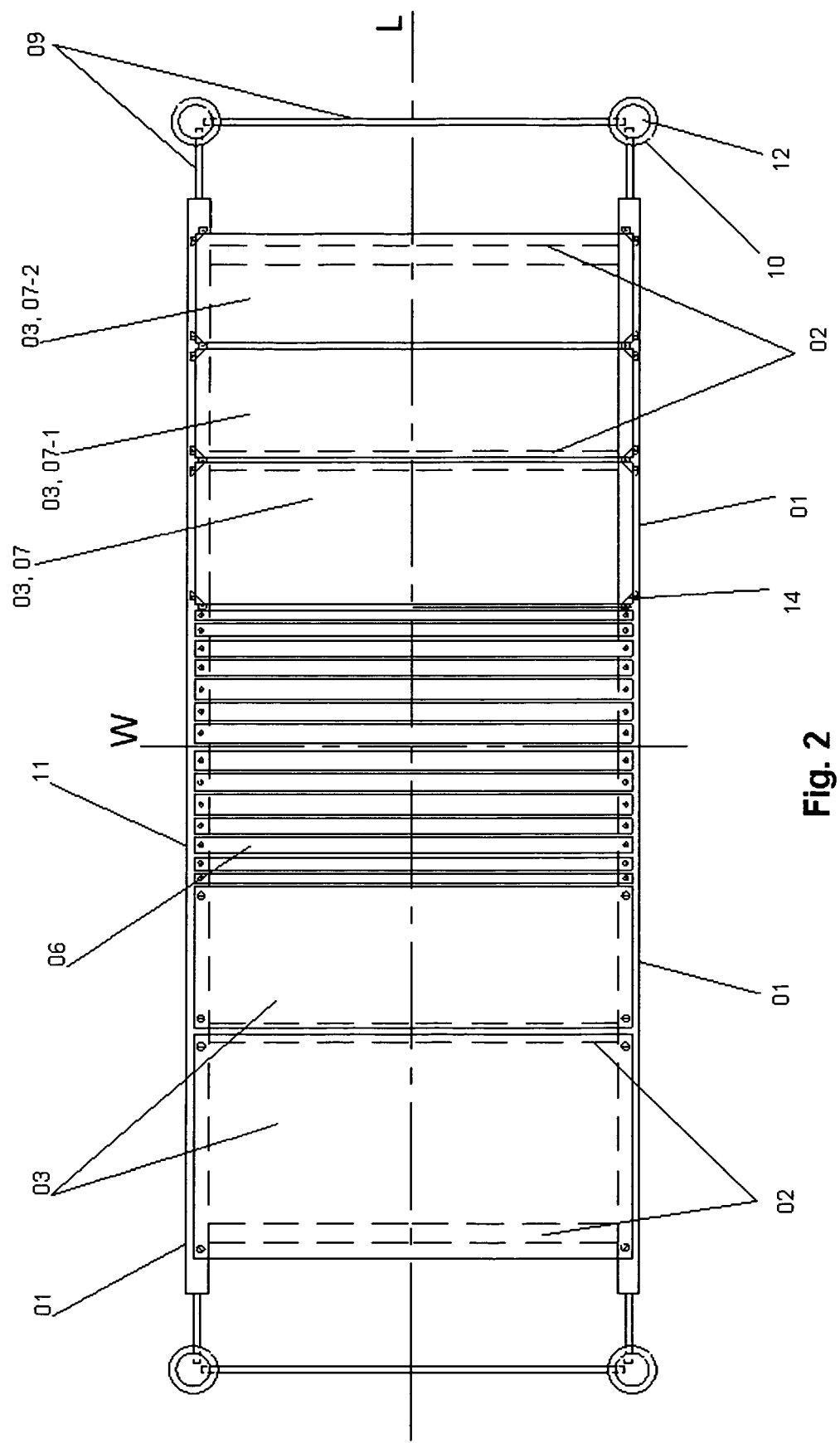
FIG. 2 is a top plan view of FIG. 1 which is an assembled decoration solar panel bridge without handrail members and supporting members.

Referring to FIG. 1 and FIG. 2, these two figures illustrate a preferred embodiment. A decoration solar panel bridge supplying power sources comprises members of components in which are frame members 01 and 11, cross brace members 02 and board members 03, 07, 07-1 and 07-2 with an option for safety fence members 09 and 10, supporting members 08 and handrail members 04 and 05.

Referring to FIG. 1, FIG. 2, FIG. 6 and FIG. 7, frame members form the length of the decoration bridge, and axis L indicates this direction. A preferred embodiment comprises a curve shape of the bridge which is constructed by two identical straight beams 01 supporting two identical top arc beams 11 on the left and right side to form the length of the decoration bridge. The left side straight beams 01 can rise up to an eighty degree angle counterclockwise from horizontal level to join the left side of the top arc beams 11. The right side beams 01 can rise up to an eighty degree angle clockwise from horizontal level to join the right side top arc beams 11. The curve shape frame includes two different alternative top round beams which is two identical semicircular round beams 11-D of FIG. 7 and two identical whole round beams 11-E of FIG. 6. The 11-D or 11-E can replace the top arc beam 11 without installing the arc handrails 05. To insure that the conjunctions smoothly attach, both ends of the straight beams 01 and ends of the top arc beams 11 may cut some angles. The connection of the straight beam 01 and the top arc beam 11 may use plates and fasteners, such as screws, bolts, nails or glues, etc.

The size of the straight beam 01 is about 85 cm in length by 5 cm in width by 5 cm in thickness according to the preferred embodiment. But the sizes of the straight beams 01, the top arc beams 11 and the alternative round beams 11-D and 11-E can be designed as the user needs depending upon the size of the decoration bridge. The span dimension of the top arc beam 11 is about 40 cm in length, arch diameter is about 40 cm and the thickness is about 4 cm according to the preferred embodiment.

The cross brace members 02 form the width of the decoration solar panel bridge. Referring to FIG. 2, an axis W indicates this direction. Pieces of the cross members, about six identical cross braces 02 in a preferred embodiment, are perpendicularly positioned between inner edges of straight beams 01. The number of the cross braces install on the left and the right side of the straight beams can be the same or different quantity. Each cross brace has same length but width and thickness can be the same or different dimension. The connections of the cross braces and the straight beams may use plates with fasteners, such as screws, bolts or glues, etc. The size of the cross brace is about 56 cm in length by 5 cm in width by 5 cm in thickness. However, the size of the cross brace can be different from an embodiment depending upon the size of the decoration bridge.

The board members comprise pieces of wide boards 03, pieces of slice boards 06 and at least one solar panel 07 or 07-1 or 07-2 incorporate into the bridge as part components of the decoration solar panel bridge. Each solar panel 07 or 07-1 or 07-2 output power can be designed for desired power consumption and the dimension can be designed as needed according to an embodiment of invention. The boards 03 including the solar panel 07, 07-1 and 07-2 cover the straight beams 01 and the cross braces 02 as part of the surface of the decoration bridge. The slice boards 06 cover the top arc beam 1. Either the boards 03 or 06 can cover two alternative round beams 11-E of FIG. 6 and 11-D of FIG. 7. The width dimension of the solar panel 07 or 07-1 or 07-2 approximately equals the length of cross brace 02, but it can be a different width dimension from 02. The solar panels 07, 07-1 and 07-2 can be the same size and output power or a different size and output power from each other. Each solar panel output power and dimension can be designed for desired power consumption and needed. The size of this solar panel 07 is about 42 cm by 53 cm, according to an embodiment. The connections of the board members 03 and 06 with the straight beams 01 and the cross braces 02 may use plates and fasteners, such as screws, bolts, nails or glues and so forth. The connections of solar panels 07, 07-1 and 07-2 with the straight beams 01 and the cross braces 02 may use corner shells 14 and can be fixed with fasteners, such as screws, bolts, nails or glues and so forth.

The optional supporting members 08 comprise four identical foot supporters 08 to support a decoration solar panel bridge. The left foot supporters 08 can rise up to a ninety degree angle counterclockwise from the ground when connected with the edge of straight beams 01. The right foot supporters 08 can rise up to a ninety degree angle clockwise from the ground when connected with the edge of the straight beams 01. To insure both parts smoothly attach together, one end of the foot supporters 08 may be cut at some angles. The length of foot supporters 08 is about 70 cm in an embodiment. And it can be a different size depending on the size of the decoration bridge. Together with foot supporters 08, the straight beams 01 may be fastened with plates, screws, bolts, nail or glues and so forth.

The optional safety members 09 and 10 comprise two safety poles 10 which attach to two fence bars 09 that are installed at each entrance of the decoration solar panel bridge to prevent pedestrian travel which is unsuitable for a decoration bridge. The size of the safety members can be designed depending upon the users' needs. Further optional safety poles 10, solar powered lights 12 can be installed on the top of safety poles to permit night view. The connections between the safety poles 10 and the fence bars 09 and the straight beams 01 may be use screws, bolts, nail or glues and so forth.

The optional handrail members comprise edge portions of handrails 04, vertical spindles of the handrails 15 and top arc handrails 05. The vertical spindle of the handrails 15 and the top arc handrails 05 form a curve shaped frame. The edge portion of handrails 04 and the vertical spindles of handrails 15 form a frame of four angle shape, a triangle shape and a ladder shape. The handrail 04 and top arc handrails 05 may be installed on the decoration bridge along the straight beams 01 and the top arc beams 11. Installation of handrails 04 and 05 can be done by drilling a few holes at the straight beams 01 and the horizontal portion of the handrails 04. The vertical spindles of the handrails 15 are set into holes between the straight beams 01 and the horizontal edge portion of the handrails 04. The connections between the horizontal handrails 04 and the top arc handrails 05 may use screws, nails or glues, etc. Further optional handrail 15, solar powered illumination stands 13 can replace the vertical spindles 15 to permit night views.

The size of the decoration solar panel bridge is approximately 160 cm in length, 47 cm in width and 95 cm high respectively, according to an embodiment.

Figure 3:
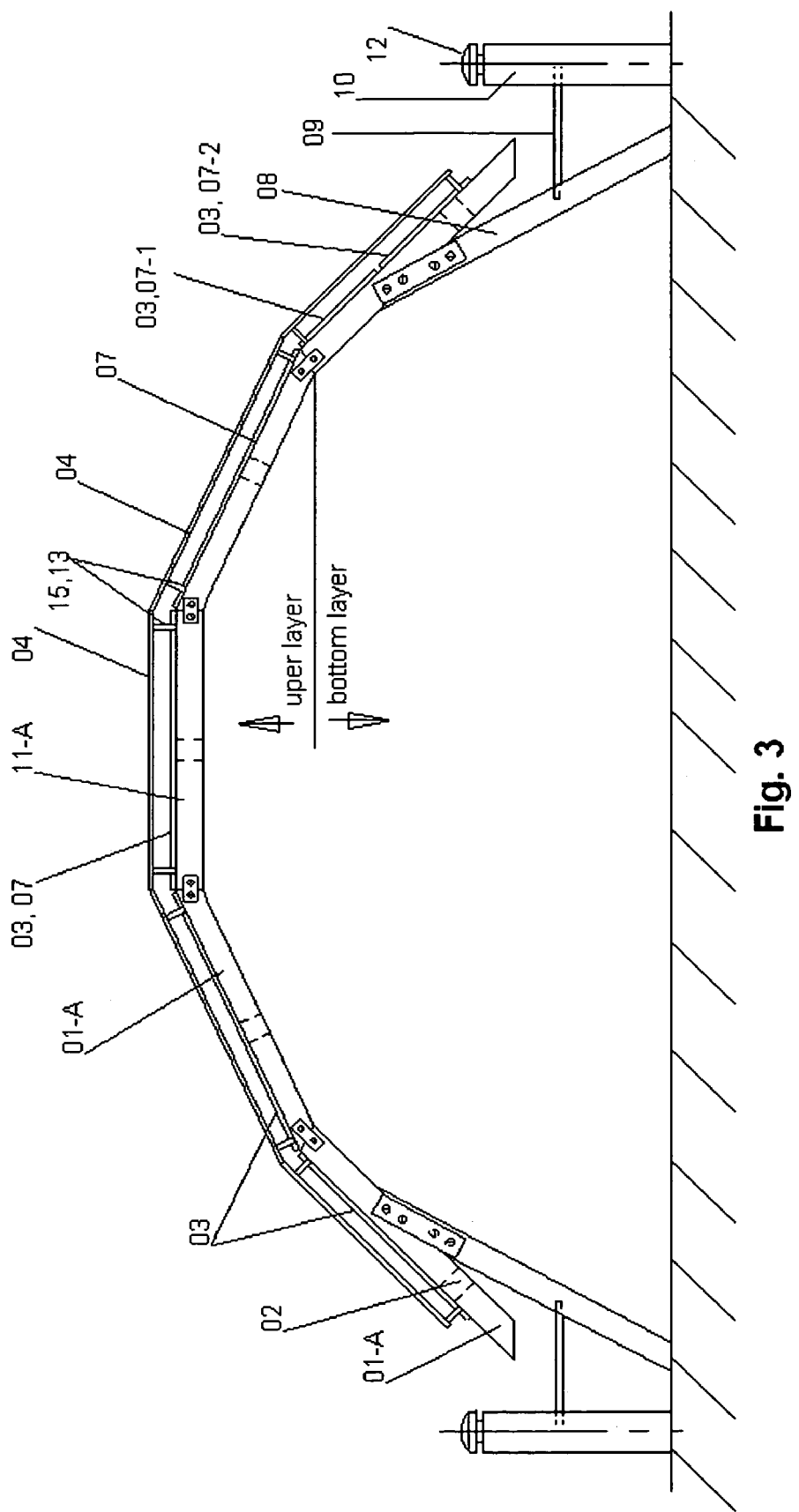
FIG. 3, FIG. 4 and FIG. 5 are three alternative embodiments of lateral views of assembled decoration solar panel bridges according to embodiments of invention.
Figure 4:
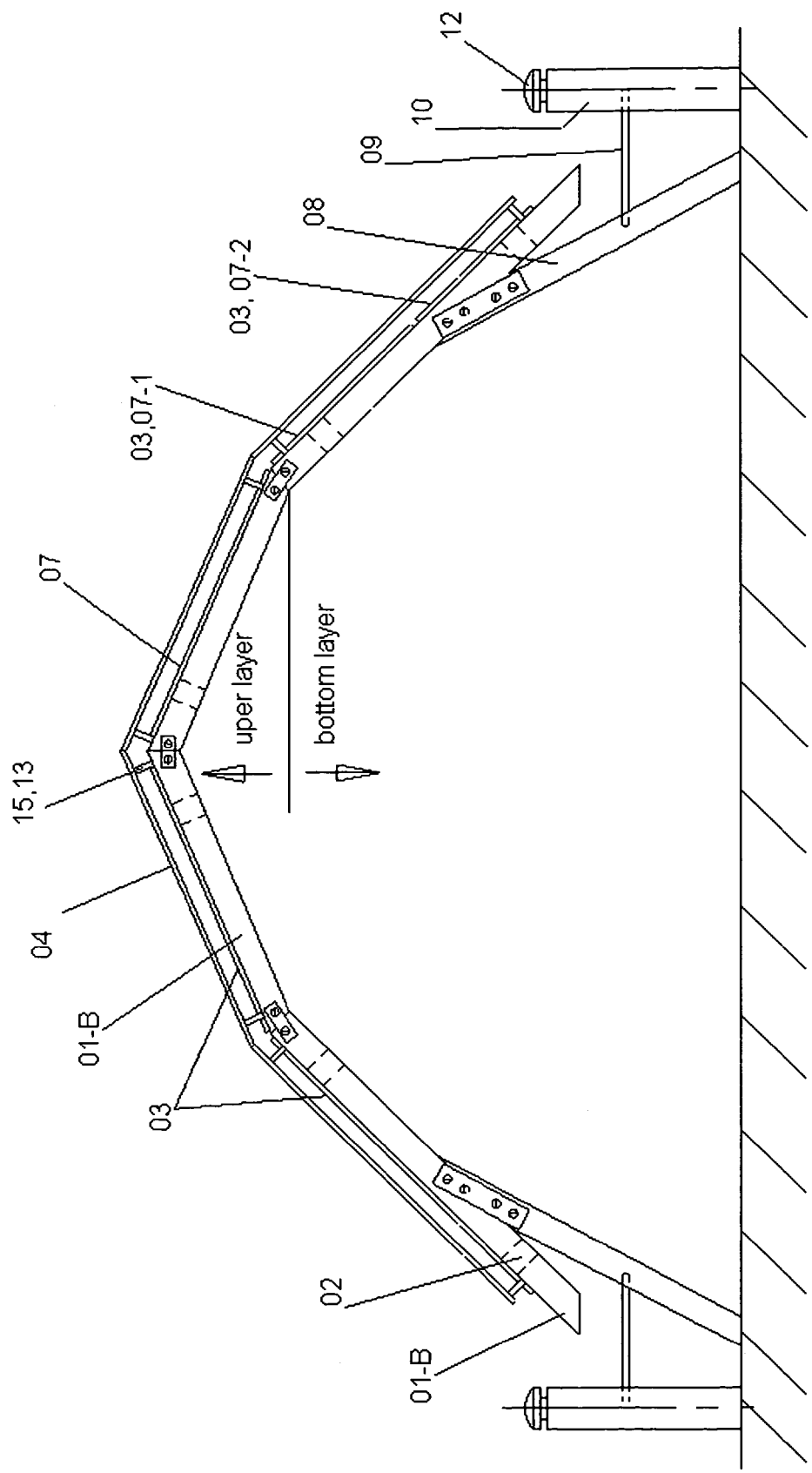
Figure 5:
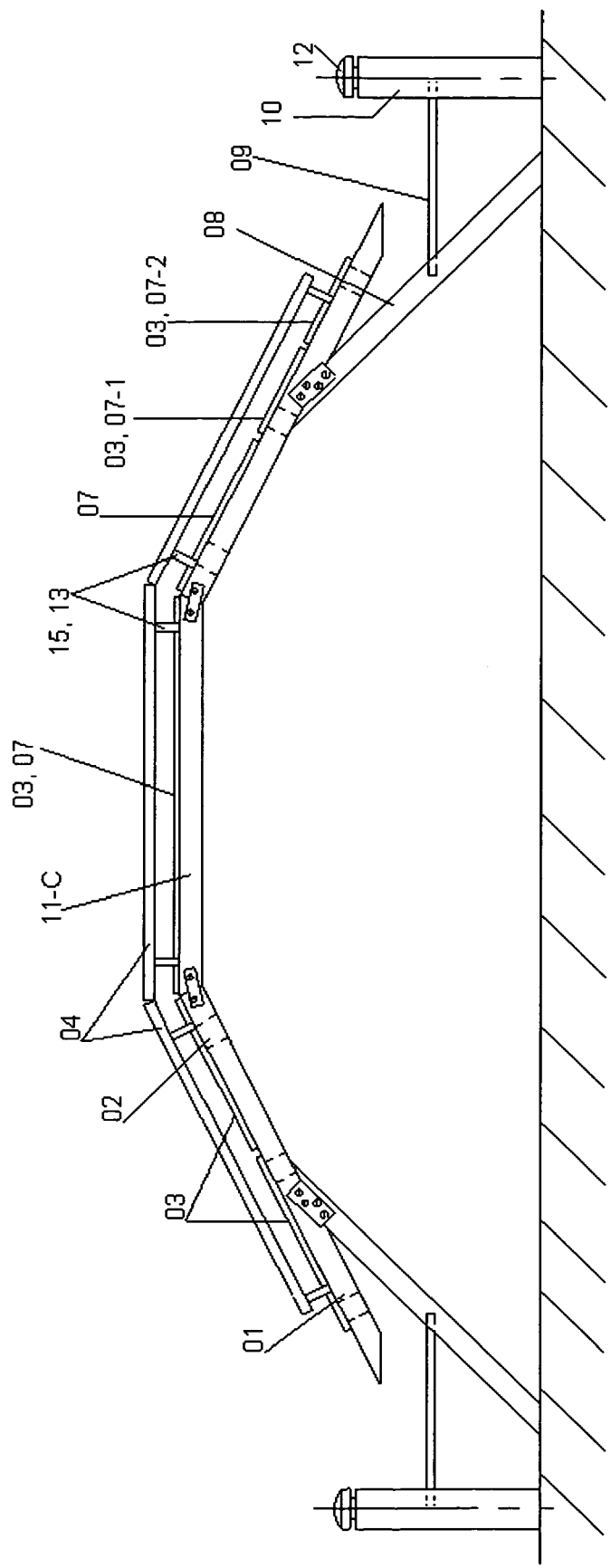
Figure 6:
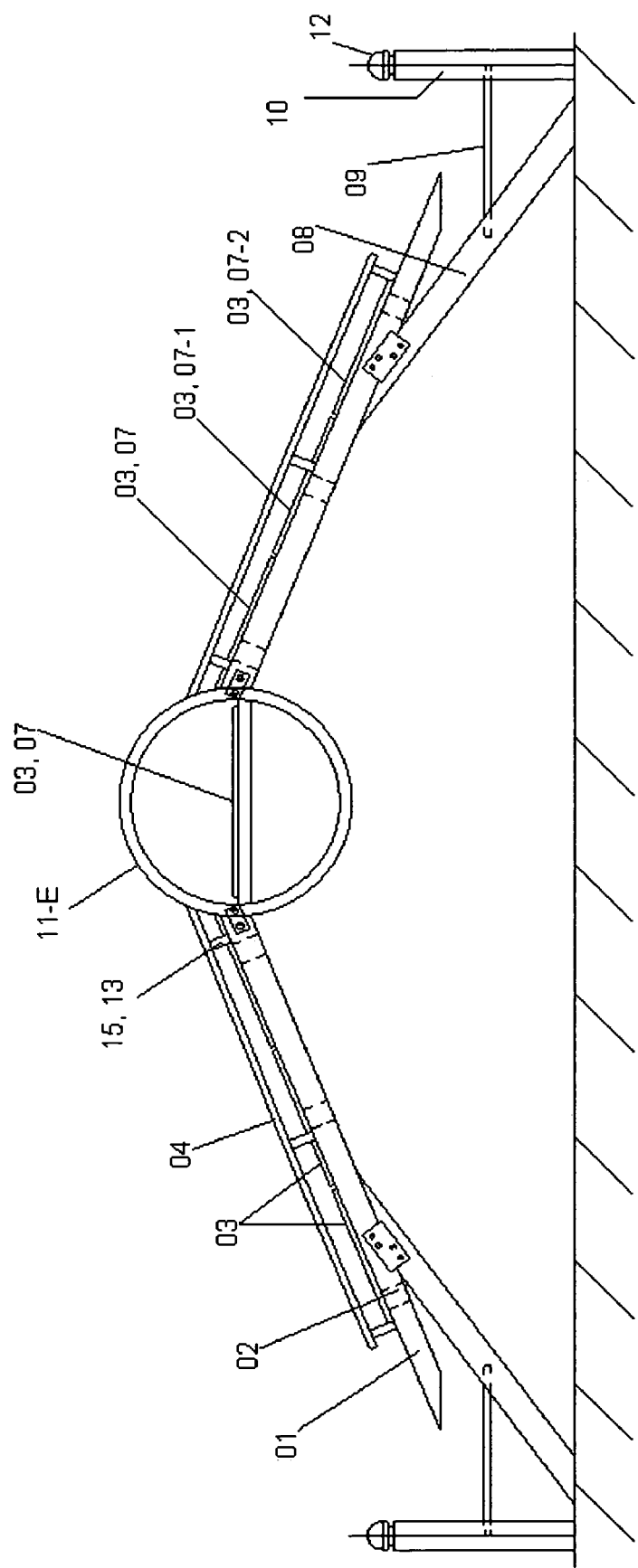
FIG. 6 and FIG. 7 are lateral views, two alternative round beams for top arc beams.
Figure 7:
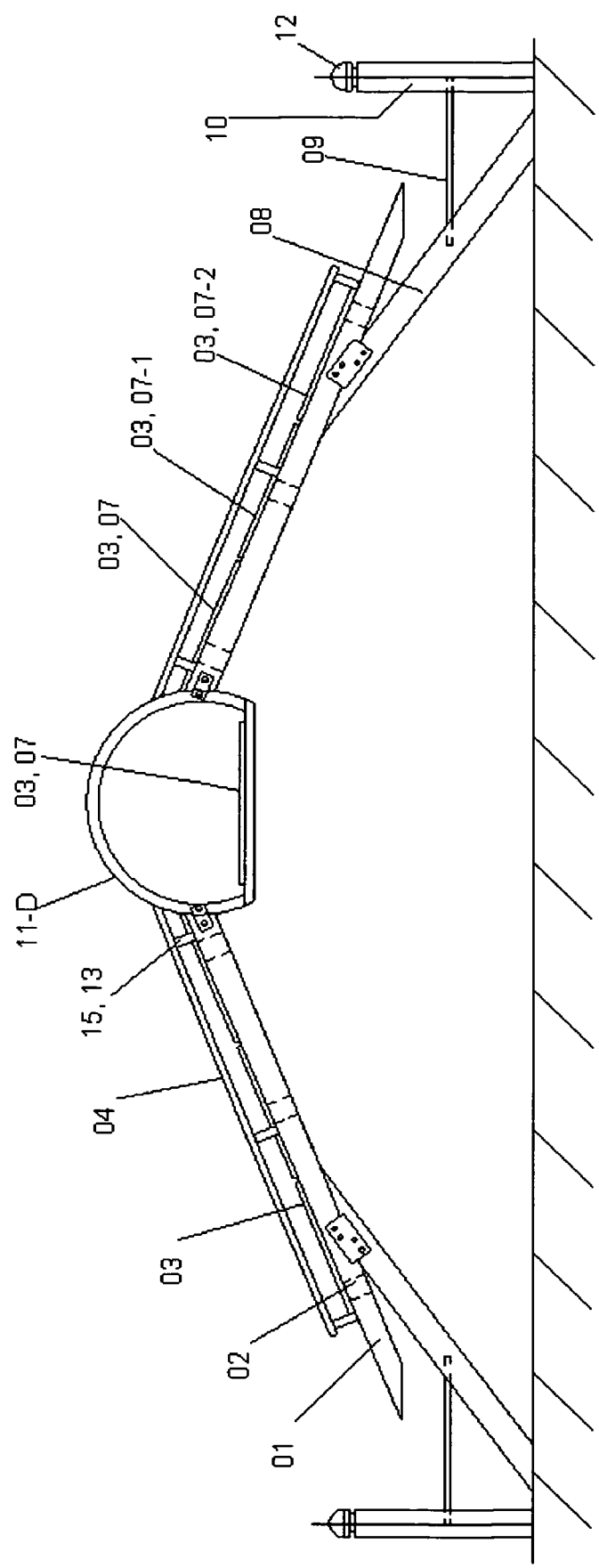

FIGS. 3, 4 and 5

Alternative Embodiments

A major difference between the preferred embodiment and alternative embodiments is frame members to be alternatively selected by the user.

Referring to FIG. 3, an alternative embodiment, a four angles shape of frame members comprising an upper and a bottom layer, each layer has four identical straight beams 01-A supporting two identical top straight beams 11-A to form a four angle shape bridge. At the upper layer, the left side upper straight beams 01-A can rise up to an eighty degree angle counterclockwise from horizontal level to connect the left side top straight beams 11-A. The right side upper straight beams 01-A can rise up to an eighty angle clockwise from horizontal level to connect the right side top straight beams 11-A. At the bottom layer, the left side two straight beams 01-A can rise up to a ninety angle counterclockwise from horizontal level to connect with the left side upper ends of the straight beams 01-A. The right side straight beams 01-A can rise up to a ninety angle clockwise from horizontal level to connect with the right side upper ends of the straight beams 01-A. The size of the upper layer four identical straight beams, the size of the bottom layer four identical straight beams and the size of the top two identical straight beams can be the same or different from each other. The sizes of the upper layer, the bottom layer and top straight beams can be designed to fit the size of the decoration solar panel bridge. To insure that conjunctions smoothly attach, ends of straight beams may be cut some degrees.

An affiliated letter 'A' is followed by an assigned part number to identify alternative parts from FIG. 1 of an embodiment. For example, eight identical straight beams 01-A can replace four straight beams 01 of an embodiment of FIG. 1. The total length of the upper and the bottom layer of the straight beam 01-A is approximately the same with the length of the straight beam 01, the width and thickness of 01 and 01-A can be the same according to an embodiment. Instead top arc beams 11 on the top of the bridge, two identical straight beams 11-A can replace 11. Flat handrails 05-A can replace top arc handrails 05 and pieces of boards 06-A can replace slice of boards 06. The connections of straight beams 01-A and top short straight beams 11-A may use screws, bolts, nail or glues and so forth.

Referring to FIG. 4, an alternative embodiment, a triangle shape bridge of frame members comprises an upper and a bottom layer where each layer has four identical straight beams 01-B to form the triangle shape bridge, according to an embodiment. At the upper layer, the left side two straight beams 01-B can rise up to an eighty angle from horizontal level counterclockwise to join the right side upper straight beams. The right side two straight beams 01-B can rise up to an eighty angle clockwise to join the left side upper straight beams. At the bottom layer, the left side two straight beams 01-B can rise up to a ninety angle counterclockwise from horizontal level to join the upper left side ends of straight beams. The right side two straight beams 01-B can rise up to a ninety angle clockwise from horizontal level to join the upper right side ends of straight beams. The upper layer of four identical straight beams can be same or different size from the bottom layer of four identical straight beams. Both sizes of the upper layer and the bottom layer of the straight beams can be designed depending upon the size of the decoration solar panel bridge. To insure that conjunctions smoothly attach, the ends of straight beams 01-B may cut some angles. To identify alternative parts from FIG. 1, a letter 'B' is followed by assigned numbers. For example, eight straight beams 01-B can replace 01 and 11 from FIG. 1. The length of the straight beam 01-B is approximately a half length of the straight beam 01. The width and thickness of 01 and 01-A can be the same according to an embodiment. The connections of straight beams 01-B may use screws, bolts, nail or glues and so forth.

Referring to FIG. 5 of an alternative embodiment, a ladder shape bridge of frame members comprises four identical straight beams 01 which support two identical top straight beams 11-C. The left side two straight beams 01 can rise up to an eighty angle counterclockwise from horizontal level to join the left side top flat straight beams 11-C. The right side two straight beams 01 can rise up to an eighty angle clockwise from horizontal level to join right side top straight beams 11-C. The length of the straight beam 01 can be the same or different with top straight beam 11-C. To insure that the conjunctions smoothly attach, the ends of straight beams may cut some angles. To identify alternative parts from FIG. 1, a letter 'C' is followed by assigned numbers. The decoration bridge looks like a ladder shape. The major difference between FIG. 5 and FIG. 1 is the top arc beam 11 and the top straight beam 11-C. The 11-C can replace 11 to make this decoration bridge top flat. The connections of straight beams 01 and 11-C may use screws, bolts, nail or glues and so forth.

The size of the decoration solar panel bridge includes preferred and alternative embodiments which can be designed as desired. For example, the length, height and width of the bridge can be approximately up to 1200 cm, 712 cm and 380 cm respectively.

The material of the decoration bridge can be plastic, wood, metal or mixed material, or any kind of material that is weather resistant for out of doors. The color of the bridge can be any color that users desire and which is suitable for the environment.

The decoration solar panel bridge supplying power sources can have commercial and residential applications such as a golf course, a resort, a public park, a forestry preserve, a residential garden and backyard, or any where to provide solar panel power supplies in a visually pleasing format. The decoration bridge incorporating solar panels creates an enjoyable-environment. Installation of the decoration solar-panel bridge is easy, quick and cost effective without hiring labor for burying wire.

Since certain changes may be made in the foregoing disclosure without departing from the scope of the invention herein involved, it is intended that all matter contained in the above description and depicted in the accompanying drawings be construed in an illustrative and not in a limiting sense.

What is claimed:

1. A decoration solar panel bridge for supplying power sources, said decoration solar panel bridge comprising of:
   (a) at least two spaced frame members and a plurality of cross brace members positioned perpendicularly to the frame members to form the width of the decoration solar panel bridge, wherein the at least two spaced frame members are each comprised of a top center arc beam supported by a straight beam to attach to each end of the top center arc beam to form the length of a generally curve shape decoration solar panel bridge;
   (b) a deck comprised of board members and including at least one solar panel substantially covering said frame members and said at least one of said cross brace members, the at least one solar panel supplying energy for desired power consumption that comprises at least one of recharging batteries, providing illumination, or a water pumping system; and
   (c) safety fence members that extend above said frame members on each side.

2. The decoration solar panel bridge of claim 1, wherein said two spaced frame members comprise two identical top center arc beams each supported by two identical straight beams on the left and right side to form the length of a generally curve shape decoration solar panel bridge, the two identical straight beams are configured to rise up to an eighty degree angle from horizontal level to connect the respective top center arc beam, the size of the straight beams design as the user needs which depends upon the size of the generally curve shape decoration solar panel bridge.

3. The decoration solar panel bridge of claim 1, wherein said cross brace members comprise pieces of cross braces, each cross brace is positioned perpendicularly between the inner edges of the straight beams of the two spaced frame members, each cross brace has a same length, the number of cross braces installed on the left and the right side are of the same or a different quantity, the size of the cross brace design depending upon the size of the decoration solar panel bridge.

4. The decoration solar panel bridge of claim 1, wherein said board members comprise pieces of wide boards and at least one solar panel that cover the straight beams and the cross braces as a partial to full surface of the generally curve shape decoration solar panel bridge, pieces of slice boards cover the top center arc beams.

5. The decoration solar panel bridge of claim 1, wherein said safety fence members comprise two safety poles attached to fence bars that install at each entrance of the decoration solar panel bridge to prevent pedestrian travel, the safety poles further provide solar powered lights that are installed on the top of safety poles to permit night view, and the size of the safety members are designed to fit users needs.

6. The decoration solar panel bridge for supplying power sources of claim 1, said decoration solar panel bridge further comprising handrail members having edge portion of the handrails, vertical spindles of handrails and top arc handrails that install along the straight beams and the top center arc beams to form the generally curve shape decoration solar panel bridge, the vertical spindle of handrails perpendicularly insert into holes between the straight beams and the edge portion of the handrails, the vertical spindles of handrails further to be replaced by solar powered illumination stands to permit night views.

7. The decoration solar panel bridge for supplying power sources of claim 1, said decoration solar panel bridge further comprising supporting members having four identical foot supporters supporting the decoration solar panel bridge, the foot supporters are configured to rise up to a ninety degree angle from horizontal level and attach to an edge of the straight beams, the size of the supporting members design depending on the size of the decoration solar panel bridge.

8. The decoration solar panel bridge for supplying power sources of claim 6, wherein said handrail members are formed from a material selected from the following: plastic, wood, metal, or a combination of plastic, wood, and metal.

9. The decoration solar panel bridge for supplying power sources of claim 7, wherein said supporting members are formed from a material selected from the following: plastic, wood, metal, or a combination of plastic, wood, and metal.

* * * * *